3,663,613
SEPARATION OF ORGANIC ACID PRODUCTS AND WATER FROM CATALYSTS AFTER SYNTHESIS BY REDUCED PRESSURE DISTILLATION
Venkatrao Krishnaraya Pai, Stamford, and Daniel Hyman, Greenwich, Conn., assignors to American Cyanamid Company, Stamford, Conn.
Filed Feb. 18, 1969, Ser. No. 800,289
Int. Cl. B01d 3/10; C07c 51/14
U.S. Cl. 260—533 A                                  7 Claims

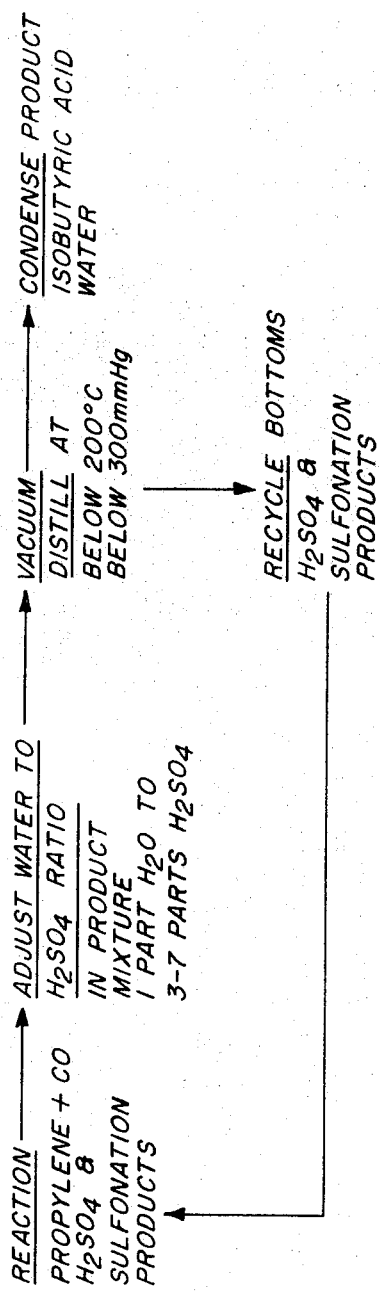

ABSTRACT OF THE DISCLOSURE

Vacuum distillation of a product mixture comprising isobutyric acid, water, sulfuric acid, and hydroxyalkanesulfonic acid with its sulfuric acid ester, surprisingly results in practically complete separation of isobutyric acid and some water leaving practically all of the other acids in the residue. Concentration of water in the residue is also reduced to desired level by vacuum distillation without expected decomposition of the olefin sulfonation products. The distillation residue is a suitable catalyst for recycle to a high pressure carbonylation reaction that produces the product mixture to be distilled. Thus the invention provides easy separation of carboxylic acid product from the catalyst which can be continuously recycled.

---

This invention relates to recovery of carboxylic acid product from a mixture thereof with sulfuric acid, water and olefin sulfonation products. Such a mixture is produced in synthesis of a lower aliphatic acid, such as isobutyric acid, by reaction of a lower aliphatic olefin, such as propylene with carbon monoxide and water in presence of a catalyst.

Reaction of an olefin, such as propylene, with carbon monoxide in presence of highly concentrated (90% or more) sulfuric acid catalyst, followed by dilution and reaction with water to complete the organic acid synthesis, is described in U.S. Pat. No. 2,831,877 patented Apr. 22, 1958 to Herbert Koch. A variation using 80–90% $H_2SO_4$ catalyst is described in U.S. Pat. No. 3,053,869 patented Sept. 11, 1962 to Charles G. McAlister et al. Before separation, the product mixture from such reactions consists of water, carboxylic acid product, sulfuric acid with olefin sulfonation products, and sometimes lesser amounts of other organic by-products. Separation of the carboxylic acid product and water from the product mixture by distillation is mentioned in U.S. Pat. No. 2,876,241, patented Mar. 3, 1959 to Herbert Koch et al. The latter patent discusses the difficulty of recovering the concentrated sulfuric acid catalyst and characterizes reconcentration of the sulfuric acid catalyst by evaporation as being extremely difficult or impossible due to presence of hydroxyalkane sulfonic acids which cause carbonization and tar formation with evolution of sulfur dioxide. The same patent suggests that rather than reconcentrating the acid by evaporation, a complete regeneration of the sulfuric acid would be necessary. The patent then proposes use of substitute catalysts to avoid the complications with distillation of the product mixture comprising sulfuric acid.

Copending U.S. application Ser. No. 800,250 titled "Production of Lower Aliphatic Acids from Olefins," filed of even date herewith by Daniel Hyman, describes a process for reaction of carbon monoxide with olefins, such as propylene, in which the catalyst feed to the reactor comprises substantial proportions of the olefin sulfonation products in addition to sulfuric acid. This catalyst, containing significant proportions of the olefin sulfonation products previously regarded as objectionable, will produce good conversion and product yield sufficient to make the process economically favorable by comparison with prior art processes which have used only high concentration sulfuric acid as a catalyst.

The drawing is a schematic diagram illustrating the steps to be carried out in one preferred process embodying the invention.

An object of the invention is to provide a relatively simple process for separation of carboxylic acid product and water from the reaction product mixture by distillation and to do so without the excessive decomposition of olefin sulfonation products described in prior art. Thus, by means of the present invention, and with the discovery by Hyman that an effective catalyst may comprise substantial proportions of olefin sulfonation products, there is provided a process for carboxylic acid synthesis with continuous cycling of catalyst through product synthesis and product recovery without need for extra catalyst regeneration steps.

From consideration of the individual properties of the respective components of the reaction product mixture, the unique and surprisingly easy separation that we have discovered could not have been predicted. The binary system isobutyric acid (IBA)-water is known to have an azeotrope of the composition 71.8 wt. percent water 28.2% isobutyric acid with normal boiling point 98.8° C. but this azeotrope is not found to occur upon distillation of the product mixture. Neither do the IBA and water components distill over as would be expected according to their respective boiling points. Distillation of the product mixture at reduced pressure produces an IBA—$H_2O$ vapor mixture that is much richer in IBA (70–75 wt. percent) than would have been predicted. This permits practically complete separation of IBA from the mixture by simple distillation and the water separated with the IBA is sufficient in some cases to reduce water content in the residue so that the residue can be recycled directly without further distillation. In other cases it is a simple matter to remove additional water as necessary by continuing to distill water from the residue until the desired concentration is reached even down to 2 wt. percent water if desired, without excessive deterioration of the residue. This easy separation of water from the mixture was not expected because of the known affinity of both sulfuric acid and the olefin sulfonation products for water.

It is found to be true, as suggested in U.S. Pat. No. 2,876,241 that when the reaction product mixture is distilled to remove isobutyric acid at ordinary atmospheric pressure, the distillation temperature must be so high that there is substantial decomposition of the olefin sulfonation product causing evolution of undesirable sulfur dioxide and leaving undesirable heavier decomposition products in the distillation residue. However, by reducing pressure so that lower distillation temperature can be used, there is obtained efficient separation of the carboxylic acid product from the catalyst components and, further, water can be removed from the catalyst for recycle without excessive decomposition of olefin sulfonation products in the residue. In preferred embodiments, one may employ a high efficiency evaporator to reduce residence time; this further reduces the tendency of olefin sulfonation products to decompose.

In the synthesis of carboxylic acids from olefins, the carbonylation reaction is carried out in a high pressure reaction zone, using pressures in the range from about 500 p.s.i.g. up to 15,000 p.s.i.g. or even higher. Optimum pressure will usually be in the range from about 3000 to 8000 p.s.i.g. In a typical batch process, the catalyst is charged to the reactor, the reactor is purged with CO, then pressurized with CO to the selected operating pressure. The olefin is slowly charged to the reactor and CO is added as needed to maintain operating pressures. Reaction temperature is maintained by heating. Operating temperatures for the reaction may vary from about 10° C. to about 150° C. and optimum reaction temperature will usually fall in the range from 50° C. to 90° C. When the reaction is complete, the pressure will stabilize without further addition of CO. The product mixture is then removed from the reaction zone and water may be added as needed to reduce decomposition of the organics in the subsequent separation. For this purpose about 1 part water for every 3–7 parts by weight $H_2SO_4$ in the mixture will be adequate. The product mixture now comprises carboxylic acid product, water and catalyst mixture which contains olefin sulfonation products, i.e. the hydroxyalkanesulfonic acid and its sulfuric acid ester, as well as $H_2SO_4$. Even if the original catalyst charge to the reactor is concentrated $H_2SO_4$, as may be convenient in starting up a continuous process, there will be formed some olefin sulfonation products in the reactor, and these will be present in the first product mixture for separation and in the first recovered catalyst which is recycled to the reactor.

When the product mixture is adequately diluted the mixture is distilled under vacuum usually in the range from about 10 to about 50 mm. Hg but in some embodiments up to about 300 mm. Hg. At such reduced pressures, the carboxylic acid product with some of the water can be distilled off at temperatures never exceeding 200° C., below the destructive temperature at which significant decomposition of the sulfonation products would occur. The residence time can be reduced by employing thin film or other high-efficiency distillation techniques. Optional use of an inert gas stream (e.g. nitrogen) for stripping also aids separation of the product.

In the separation it is advantageous to employ a counterflow of steam which provides necessary heat and carries product vapors to the condensers. This steam stripping provides an added means for precise control of the distillation column to facilitate complete separation of the carboxylic acid product in the once-through operation. The residual mixture of sulfuric acid and sulfonation products with residual water can be either directly recycled as catalyst, or if desired, can be further concentrated in a second thin-film evaporator before recycle.

EXAMPLE I

A reaction mixture taken directly from a high pressure carbonylation reaction similar to that described in Example 1 of the aforementioned Hyman patent application Ser. No. 800,250, is diluted with water so that the diluted mixture contains roughly one part water for every 3–4 parts $H_2SO_4$. Composition of the diluted mixture in weight percent is:

Isobutyric acid _____ 13.9
Water _____ 17.2
Sulfonation products - 2 - hydroxypropane-1-sulfonic
  acid (HSA), and its sulfuric acid ester (SAE) __ 7.1
$H_2SO_4$ _____ 58.2
Miscellaneous _____ 3.6

The distillation apparatus consists of a 500 ml. Pyrex distillation pot fitted with a stirrer, a glass tube for introduction of a stream of nitrogen, and a vapor outlet. The pot is mounted in a heating mantle which provides heat as needed for the distillation. Two hundred ml. of the diluted mixture is placed in the distillation pot and the vapor outlet is connected to a condenser which in turn is connected to a vacuum pump. After pressure on the system has been reduced to 10 mm. Hg, temperature of the liquid in the pot is quickly raised to 140° C. Total heating time is nine minutes. 96% of the isobutyric acid is recovered. The distillation residue in the pot consists of 76.1 wt. percent sulfuric acid, 9.1 percent 2-hydroxypropane-1-sulfonic acid and its sulfuric acid ester, 9.6 wt. percent water and 0.8 percent isobutyric acid, the remainder being miscellaneous heavy organics. This residue is ready for re-use directly as catalyst recycle to the high pressure carbonylation reaction.

EXAMPLE II

A unit for continuous, low residence-time operation is assembled and used as follows:

A 25 cm. long 1.5 cm. diameter glass inner tube with a 3.5 cm. diameter outer glass jacket is fitted at the top with a circular weir which feeds diluted reactor effluent continuously as a thin film down the wall of the inner tube which serves as the distillation chamber. Ethylene glycol vapors are condensed in the outer jacket to provide heat through the inner tube wall for vaporization. Temperature is controlled by varying the pressure in the ethylene glycol system. Vapors are continuously drawn from the column and let to a condenser. Residue collected at the bottom of the chamber is continuously drawn off. A stream of nitrogen is fed slowly through the column from the lower end.

The feed to be distilled is the product stream, after dilution, from a high pressure continuous reaction similar to the one described in more detail in Example II of the aforementioned Hyman U.S. Pat. application Ser. No. 800,250. Before the reactor effluent enters the distillation apparatus, it may be diluted with water as needed to provide one part by wt. water for every 3–7 parts by wt. $H_2SO_4$ in the diluted mixture. Flow rate and temperature and pressure in the distillation zone are adjusted to effect distillation of essentially all of the IBA and of the desired proportion of water. The determining factor for operating conditions in the distillation chamber will usually be the concentration of water desired to be left in the distillation residue. For this example flow rate is adjusted to provide residence time less than three minutes. The temperature in the distillation zone is selected at a value so that the highest temperature in the zone never exceeds 200° C. and the pressure is selected at a value below 300 mm. Hg absolute. Within these limits, the operating temperature and pressure are selected to optimize the desired degree of distillation with minimum residence time in the evaporation zone. Typical operating data for two runs demonstrating a single stage separation process embodying the invention are as follows:

(a) Initial Feed Composition (wt. percent): IBA—
  12.3%; $H_2O$—9.1%; olefin sulfonation products—
  28.8%; $H_2SO_4$—49.8%
Wall temperature in the column—160° C.
Residence time of liquid in the column—5 seconds
Pressure—22 mm. Hg; Nitrogen flow rate—30 cc./min.
  (STP)
Residue composition (wt. percent): IBA—0.8%; $H_2O$—
  1.5%
(b) Initial feed composition same as in (a) above.
Wall temperature in the column—175° C.
Residence time of liquid in the column 2 seconds
Pressure: 24 mm. Hg; Nitrogen flow rate—30 cc./min.
  (STP))
Residue contained (wt. percent): IBA—3.5%; $H_2O$—
  2.1%.

EXAMPLE III

A unit for continuous, low residence-time open-steam stripping operation is assembled and used as follows:

A 25 cm. long, 2.5 cm. diameter glass tube is mounted vertically. The diluted reactor effluent preheated to 50–100° C. is fed tangentially into the tube near the top. Steam is fed at a controlled rate from the lower end of the tube. The tube is well insulated and pressure in the system is maintained at the desired level. Product vapors are continuously drawn from the column and let to a condenser. The residual liquid, continuously drawn off from the bottom, is essentially an equilibrium mixture of water, sulfuric acid and the sulfonated products. The liquid flow rate, steam supply and pressure in the column are controlled so that the liquid mixture collected from the bottom is substantially free of carboxylic acid and contains the desired amount of water. This can be directly recycled to the reactor.

Feed liquid is a product stream, after dilution, from a high pressure reaction similar to the one described in more detailed in Example II of the aforementioned Hyman U.S. Pat. application Ser. No. 800,250. Results of an experiment using this apparatus are as follows:

Feed liquid composition (wt. percent): IBA—14.8%; $H_2O$—9.0%; $H_2SO_4$—53.8% and olefin sulfonation products 22.4%

Feed temperature: 50° C.

Steam supply into the column: 1 atm. steam, 42.0 parts by weight per 100 parts of feed Pressure—50 mm. Hg Residual liquid composition—0.6% IBA; 15.5% $H_2O$; 59.3% $H_2SO_4$; and 24.6% olefin sulfonation products.

EXAMPLE IV

A continuous process for synthesis and recovery of a carboxylic acid product embodying the invention is carried out as follows:

The synthesis step is like the one described in Example II of the aforementioned Hyman U.S. Pat. application Ser. No. 800,250. Propylene (100 parts by wt.), carmon monoxide (70 parts by wt.) and recycled catalyst (1920 parts by wt.) are fed continuously to a high pressure stirred reaction vessel. Reactor pressure is maintained at 5000 p.s.i.g. and temperature of the reactor contents is maintained at 55° C. Recycled catalyst comprises water (7 wt. percent), sulfuric acid (30%) and sulfonation products (60%). A make-up stream comprising 170 parts by weight of sulfuric acid and 37 parts by weight of water is also added to the reactor. A reactor product stream containing 6.1 wt. percent of IBA is continuously removed from the reaction vessel. The reactor product mixture is diluted with 238 parts by weight of water.

Product separation is carried out in a two-stage continuous unit. The first stage is an open-steam distillation system similar to the one described in Example III above. The diluted reactor product mixture is continuously fed into the first stage distillation column maintained at 50 mm. Hg pressure and 1360 parts by weight of steam at one atm. is fed into the column. Vapors are continuously withdrawn from the top. The residual liquid (2370 parts by weight) containing 16.2% by wt. of water and less than 0.1% wt. of IBA is continuously drawn from the bottom of the column and fed into a second stage concentrator. The second stage unit is similar to the one described above in Example II. Pressure in the column is maintained at 25 mm. Hg and the maximum temperature is 160° C. Residence time in the column is approximately 5 seconds. The residual liquid (2140 parts by wt.) is continuously drawn off from the bottom of the column and 1920 parts of it is fed back to the reactor as recycle catalyst mixture, with the rest of the stream being purged.

We claim:

1. Process for separation of isobutyric acid and water components from a product mixture comprising said components and further comprising about 3 to 7 parts sulfuric acid per part of water, and 2-hydroxypropane-1-sulfonic acid and its sulfuric acid ester, said process comprising the step of distilling from said product mixture at reduced pressure below 300 mm. Hg with maximum distillation temperature below 200° C. a vapor mixture consisting essentially of a major proportion of isobutyric acid and a minor proportion of water until substantially all isobutyric acid is distilled over.

2. Process defined by claim 1 wherein water constitutes less than 20 wt. percent of the distillation residue.

3. Process defined by claim 1 wherein said distilling step is carried out in thin film apparatus with residence time in the distillation zone not more than 3 minutes.

4. Process defined by claim 1 wherein the defined distillation step is carried out in presence of steam added for heating and stripping.

5. Process for synthesis and recovery of a lower aliphatic acid comprising the steps of:
   (a) reacting CO with propylene and water in a reaction zone in presence of a catalyst comprising $H_2SO_4$ to produce isobutyric acid, and
   (b) distilling the product mixture from step (a), with about one part by weight of water for every 3 to 7 parts $H_2SO_4$ in the mixture to be distilled, at pressure less than 300 mm. Hg and temperature less than 200° C. so that substantially all of the isobutyric acid component is distilled over in a vapor mixture consisting essentially of a major proportion of isobutyric acid and a minor proportion of water.

6. A continuous process comprising the steps defined in claim 5 wherein residue recovered from the distillation in step (b) and comprising less than 20 percent water is recycled as catalyst directly to the reaction zone in step (a).

7. Process defined by claim 5 wherein the defined distillation step is carried out in presence of steam added for heating and stripping.

References Cited

UNITED STATES PATENTS

| | | | |
|---|---|---|---|
| 2,831,877 | 4/1958 | Koch | 260—413 |
| 2,876,241 | 3/1959 | Koch et al. | 260—413 |
| 2,994,645 | 8/1961 | Jones et al. | 203—91 |
| 3,167,585 | 1/1965 | Anderson et al. | 260—533 A |
| 3,201,331 | 8/1965 | Hunter | 203—89 |
| 3,282,993 | 11/1966 | Chafetz et al. | 260—533 A |

WILBUR L. BASCOMB, Jr., Primary Examiner

U.C. Cl. XR.

203—15, 91, 89; 260—413